United States Patent Office 2,784,198
Patented Mar. 5, 1957

2,784,198

PROCESS OF MAKING WATER-SOLUBLE SALTS OF SULPHURIC ACID ESTERS OF LEUCO VAT DYESTUFFS OF THE ANTHRAQUINONE SERIES

Eduard Peyer, Basel, Switzerland, assignor to Durand & Huguenin A. G., Basel, Switzerland, a Swiss company No Drawing. Application May 25, 1953,
Serial No. 357,335

Claims priority, application Switzerland May 30, 1952

7 Claims. (Cl. 260—316)

In copending application, Ser. No. 212,834, filed March 26, 1951 (and abandoned since the filing of the present application) is described a process for the manufacture of water-soluble salts of sulphuric acid esters of leuco vat dyestuffs of the anthraquinone series which are difficult to esterify, wherein the vat dyestuff is treated in a mixture of α-picoline and diethylcyclohexylamine containing 10–60 percent by weight of diethylcyclohexylamine and in the presence of finely divided copper or brass with chlorosulphonic acid in the form of its addition products with the said bases, the chlorosulphonic acid, the mixture of bases and the copper being present in at least certain specified minimum proportions, and the resulting sulphuric acid ester compound is converted into a water-soluble ester salt.

In the process of copending application, Ser. No. 319,174, filed November 6, 1952 (and abandoned since the filing of the present application), the invention of which is an improvement in or modification of the invention of application Ser. No. 212,834, there is used, instead of or in addition to finely divided copper or brass, at least one finely divided metal of the iron group (group VIII, period 3, of the periodic system), namely iron, cobalt and nickel.

The present invention provides a process for the manufacture of water-soluble salts of sulphuric acid esters of leuco vat dyestuffs of the anthraquinone series which are difficult to esterify, wherein the vat dyestuff is treated in a mixture of at least one dialkyl-formamide of the general formula

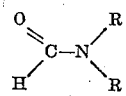

in which both R's represent a member selected from the group consisting of CH₃ and C₂H₅, with at least one compound selected from the group consisting of diethyl-cyclocyclohexylamine and at least one diethyl-(monomethylcyclohexyl)-amine, the said mixture containing 10–70 percent by weight of the said amine or amines, and in the presence of at least one finely divided metal selected from the group consisting of iron, cobalt, copper and copper alloys, with chlorosulphonic acid in the form of its addition products with at least one of the said amines, and the resulting sulphuric acid ester compound is converted into a water-soluble ester salt.

As vat dyestuffs of the anthraquinone series which are difficult to esterify there are to be understood those of which the sulphuric acid ester salts can be obtained by the usual methods of esterification only in small yields, that is to say, yields which are insufficient for commercial purposes or are trace-like, or in the form of products which cannot be converted or can be converted only partially into the original dyestuff by the usual method of application. For the purposes of the present invention, the anthraquinone vat dyestuffs in question are those which are difficult to esterify as determined by the test given in application Ser. No. 212,834, namely, those anthraquinone vat dyestuffs which give an ester yield of less than 25% relative to the weight thereof when esterified by means of a mixture of α-picoline and chlorosulphonic acid (10:1 by weight) in the presence of copper powder. Vat dyestuffs of the anthraquinone series which are difficult to esterify are found, for example, in the following classes:

1. 1-aroylaminoanthraquinones which contain as a substituent in the 4-, 5- or 8-position an acylamino or alkoxy group or halogen atom, and especially diaroyl-aminoanthraquinones and their derivatives containing substituents in the benzene nuclei.
2. Anthraquinone-carbazoles.
3. Anthrimides.

The chlorosulphonic acid may be introduced into the reaction mixture as such or partially or completely in the form of an equivalent mixture of sulphur trioxide and hydrogen chloride or in the form of a sulphur trioxide addition product and a hydrochloride of one or more of the bases used.

The dialkyl-formamide of the above formula may be used either in pure form or as a commercial product. The quantity of dialkyl-formamide necessary for the reaction may be in the form of a mixture of any desired relative proportions of dimethyl-formamide and diethyl-formamide, for example, in the ratio 1:9, 1:1 or 9:1.

The diethylcyclohexylamine and the diethyl-(monomethylcyclohexyl)-amine may be used in the form of the pure bases or as commercial anhydrous products. As diethyl-(monomethylcyclohexyl)-amines there are to be understood the three methyl-homologues of diethyl-cyclohexylamine, namely diethyl-(2-methylcyclohexyl)-amine, diethyl-(3-methyl-cyclohexyl)-amine and diethyl-(4-methylcyclohexyl)-amine. There may be used only one of the said diethyl-(monomethylcyclohexyl)-amines or a mixture of two or all of the said amines, or, if desired, a mixture of at least one diethyl-(monomethylcyclohexyl)-amine with diethyl-cyclohexylamine.

The use of a mixture of the dialkyl-formamide with diethyl-cyclohexylamine and/or at least one diethyl-(monomethylcyclohexyl)-amine in suitable relative proportions is of critical importance in the present process. Thus, in order to obtain commercially valuable results it is essential that the proportion of diethyl-cyclohexyl-amine and/or diethyl-(monomethylcyclohexyl)-amine in the basic mixture should be at least 10 percent and at most 70 percent on the weight of the mixture. Advantageously the proportion of diethylcyclohexylamine and/or diethyl-(mono-methylcyclohexyl)-amine in the basic mixture lies within the range of 25 to 60 percent, as then yields of usable sulphuric acid ester salts amounting to more than 90 percent can be obtained. In order to obtain an optimum yield of sulphuric acid ester salt, the proportion of diethyl-cyclohexyl-amine and/or diethyl-(monomethylcyclohexyl)-amine must be chosen within the aforesaid proportions depending on the behaviour of the particular vat dyestuff used.

In carrying out the process it is not essential to use from the outset a mixture of the dialkyl-formamide with diethyl-cyclohexylamine and/or diethyl-(monomethylcyclohexyl)-amine, so that, for example, one of the components of the basic mixture may first be reacted with chlorosulphonic acid and then mixed with suitable quantities of the other components. It is essential only that, before the commencement of the esterification reaction, the dialkyl-formamide and the amines should be present in suitable relative proportions.

The proportion of the basic mixture (dialkylformamide and amine or amines) must be such as to provide at least 1.4 molecular proportions of the amine or amines for every 2 molecular proportions of chlorosulphonic acid used, except that if less than 4 molecular proportions of the acid is used not less than 2 molecular proportions of the amine or amines should be present for every 2 molecular proportions of the acid. However, in order to obtain optimum results, it will usually be necessary to use a proportion of chlorosulphonic acid, and correspondingly of the basic mixture, several times greater than the minimum proportions mentioned above. The most favourable excess to use depends on the properties of the particular vat dyestuff to be esterified, and can easily be determined by preliminary tests.

The sulphuric acid ester compound resulting from the esterification is converted into a water-soluble ester salt by a method in itself known, for example, by treatment with a suitable base or by any other conventional method. Especially suitable water-soluble sulphuric acid ester salts are the lithium, sodium, potassium, ammonium and hydroxyalkylamine salts.

In the present process there is used as the metal finely divided iron, cobalt, copper or a copper alloy. By the expression "finely divided" there is to be understood, for example, the powdered form hitherto used, and preferably a fineness such that the metal passes through a 150 to 200 mesh sieve (see Handbook of Chemistry and Physics, 31st edition, page 2669). The proportion of the metal should be at least 1.5, and preferably at least 2, atomic proportions for each anthraquinone nucleus present in the vat dyestuff. However, it will usually be of advantage to use a proportion considerably in excess of the minimum proportion.

In one form of the process the reaction is carried out in the presence of not only one of the said metals, but in the presence of a plurality of these metals. It is of special advantage from the practical point of view to use iron, owing to its low cost.

In another form of the process the metal to be used is subjected to an activating treatment prior to the esterification process and in the absence of the vat dyestuff to be esterified.

This activating treatment may be carried out in various ways, for example,

1. By the addition of the metal powder to the basic mixture and subsequently introducing the chlorosulphonic acid dropwise.
2. By the addition of the metal powder to a preformed mixture of dialkyl-formamide/SO$_3$ and dialkyl-formamide/HCl, and introducing the diethyl-cyclohexylamine and/or diethyl(monomethylcyclohexyl)-amine.
3. By introducing the chlorosulphonic acid into the basic mixture and then adding the metal powder thereto.
4. By activating the metal powder in the absence of the basic mixture and subsequently adding it to that mixture. Thus, the activation may be carried out, for example, by treating iron powder for a short period with glacial acetic acid at a raised temperature, filtering with suction and washing the filter residue (consisting of activated iron) with α-picoline, or by any other well known method.

If desired, the process may be carried out with the exclusion of oxygen.

The new process is distinguished in that it is possible by starting from the vat dyestuff to obtain in a single operation and in very good yield a sulphuric acid ester salt which can be reconverted into the original vat dyestuff by known methods of application.

In British Patent No. 610,117 is described a process in which a vat dyestuff is treated with chlorosulphonic acid in the presence of a metal, for example, iron, nickel, copper or brass, and an organic amide, including dimethyl-formamide or diethyl-formamide. The process may also be conducted in the presence of a diluent which may be a tertiary base such, for example, as pyridine or triethylamine. The process is described with reference to vat dyestuffs in general. If, however, vat dyestuffs of the anthraquinone series which are difficult to esterify, as hereinbefore defined, are treated by the process of the aforesaid British patent, that is to say, with the addition of pyridine or triethylamine, there are obtained either insufficient yields of the sulphuric acid ester salts as well as useless products or almost exclusively useless products which cannot be reconverted into the original vat dyestuffs.

In order to obtain favourable yields of sulphuric acid ester salts it is necessary to use diethyl-cyclohexylamine and/or its methyl homologues in conjunction with the dialkyl-formamide.

If in the basic mixture the diethyl-cyclohexylamine and/or the diethyl-(monomethylcyclohexyl)-amine were replaced, for example, by dimethyl-cyclohexylamine, cyclohexylamine or triethylamine, there would be obtained at best only unimportant quantities of sulphuric acid ester salts in addition to useless products.

The following examples illustrate the invention, the parts being by weight:

*Example 1*

20 parts of chlorosulphonic acid are introduced into 160 parts of commercial dimethyl-formamide, while cooling and stirring, and after the addition of 25 parts of iron powder the mixture is stirred for a further 10-15 minutes at 12-15° C., and there are added 56 parts of diethyl-cyclohexylamine, while cooling, and subsequently 10 parts of 1:5-dibenzoylamino-anthraquinone. The whole is heated, while stirring, to 55-57° C. until dissolution of the dyestuff is complete, which takes place in about 3-4 hours. The reaction mixture may then be worked up as follows:

After being cooled, the mixture is introduced into 1500 parts of ice water, whereupon the diethyl-cyclohexylamine salt of the sulphuric acid ester precipitates. After filtering the mixture, the filter residue is stirred in a mixture of 80 parts of ethyl alcohol, 20 parts of an aqueous solution of sodium hydroxide of 30 percent strength and 250 parts of water for 30 minutes at 40° C. The solution is filtered to remove the residues of iron, and, after separating the alcohol and diethylcyclohexylamine, the sulphuric acid ester of leuco-1:5-dibenzoylaminoanthraquinone is salted out by means of sodium chloride in the form of its sodium salt in a yield exceeding 90 percent. When the above sulphuric acid ester salt is applied to textiles by known methods yellow tints are produced.

In the above process the 25 parts of iron powder may be replaced by 15 parts of brass powder, and the 25 parts of iron powder may be replaced by a mixture of copper powder and 10 parts of iron powder, and the same result is obtained in both cases. If the iron powder is replaced by the same quantity of cobalt powder, the sulphuric acid ester salt is obtained in a yield of over 60 percent.

By using, instead of 56 parts of diethyl-cyclohexylamine, 45.6 parts of dimethylcyclohexylamine, there is obtained almost exclusively a product which cannot be reconverted into the vat dyestuff by the usual methods of application, that is to say, no usable sulphuric acid ester salt of leuco-1:5-dibenzoylamino-anthraquinone is obtained.

*Example 2*

20 parts of chlorosulphonic acid, 25 parts of iron powder and 56 parts of diethyl-cyclohexylamine are introduced in succession in that order into 160 parts of commercial diethyl-formamide boiling at 174-178° C., while cooling and stirring. After the addition of 10 parts of 1:5-dibenzoylaminoanthraquinone, the mixture is heated at 56-58° C. for 6-7 hours, while stirring. By working up the products as described in Example 1 there is obtained the sodium salt of the sulphuric acid ester of leuco-1:5-dibenzoylaminoanthraquinone in a yield exceeding 90 percent.

Instead of 25 parts of iron powder, there may be used 25 parts of powdered cobalt, in which case the temperature is advantageously maintained at 67–69° C. for 6–7 hours.

By using instead of 56 parts of diethyl-cyclohexylamine, 62 parts of diethyl-(3-methylcyclohexyl)-amine the sulphuric acid ester salt is likewise obtained in a yield exceeding 90 percent.

With the same result there may be used, instead of diethyl-(3-methylcyclohexyl)-amine, diethyl-(2-methylcyclohexyl)-amine, diethyl-(4-methylcyclohexyl)-amine or a mixture of two or all of these homologues, and there may also be used a mixture of one or more of the three homologues with diethyl-cyclohexylamine.

Example 3

20 parts of chlorosulphonic acid are introduced into a mixture of 160 parts of dimethyl-formamide and 56 parts of diethyl-cyclohexylamine, while cooling and stirring. After the addition of 25 parts of iron powder and 10 parts of 1:5-dibenzoylaminoanthraquinone, further treatment and working up are as described in Example 1.

In this manner there is obtained the sulphuric acid ester salt of leuco-1:5-dibenzoylaminoanthraquinone in a yield exceeding 90 percent.

Example 4

20 parts of chlorosulphonic acid, 15 parts of copper powder and 56 parts of diethyl-cyclohexylamine are introduced in succession in that order into 160 parts of commercial diethyl-formamide, while cooling and stirring. After the addition of 10 parts of 1:4-dibenzoylaminoanthraquinone, the mixture is heated for 1½ to 2 hours at 50° C.

By working up as described in Example 1, there is obtained the sulphuric acid ester salt of leuco-1:4-dibenzoylaminoanthraquinone in a yield of 87 percent.

By using, instead of 15 parts of copper powder, a mixture of 10 parts of iron powder and 10 parts of copper powder the sulphuric acid ester salt is obtained in the same good yield.

By using in this example, instead of 56 parts of diethyl-cyclohexylamine, 35.8 parts of cyclohexylamine or 45.6 parts of dimethyl-cyclohexylamine there is obtained almost exclusively a product which can no longer be reconverted into the vat dyestuff by the usual methods of application.

Example 5

20 parts of chlorosulphonic acid are introduced dropwise into 224 parts of dimethyl-formamide, while cooling and stirring, 25 parts of iron powder are added, and the whole is stirred for 10 minutes at 10–15° C. While cooling there are added 56 parts of diethyl-cyclohexylamine and then 10 parts of 1:5-dibenzoylaminoanthraquinone, and the product is worked up as described in Example 1.

In this manner the yield of the sulphuric acid ester salt of leuco-1:5-dibenzoylaminoanthraquinone exceeds 80 percent.

Example 6

20 parts of chlorosulphonic acid, 25 parts of iron powder and 56 parts of diethyl-cyclohexylamine are introduced in succession in that order into 224 parts of diethylformamide, while cooling and stirring. After the addition of 10 parts of 1:4-dibenzoylaminoanthraquinone, the whole is heated at 56–58° C. for 1–2 hours, while stirring.

By working up the product as described in Example 1, there is obtained the sulphuric acid ester salt of leuco-1:4-dibenzoylaminoanthraquinone in a yield exceeding 80 percent.

By using, instead of 224 parts of diethyl-formamide, 38 parts thereof the sulphuric acid ester salt is obtained in a yield exceeding 90 percent.

Example 7

The procedure is the same as that described in Example 1, except that, instead of 160 parts of dimethylformamide, there is used a mixture of 80 parts of diethylformamide. In this manner the sulphuric acid ester salt of leuco-1:5-dibenzoylaminoanthraquinone is also obtained in a yield exceeding 90 percent.

The same result is obtained by using, instead of 25 parts of iron powder, 15 parts of brass powder.

Example 8

20 parts of chlorosulphonic acid are introduced into 38 parts of dimethyl-formamide, while cooling and stirring. After the addition of 25 parts of iron powder, the whole is stirred for a further 10 minutes at 12–15° C., and 56 parts of diethylcyclohexylamine and then 10 parts of 1:4-dibenzoylaminoanthraquinone are added while cooling. The reaction mixture is worked up as described in Example 1.

The yield of the sulphuric acid ester salt of leuco-1:4-dibenzoylaminoanthraquinone exceeds 90 percent.

When the above sulphuric acid ester salt is applied to textiles by known methods there are obtained red tints.

Example 9

20 parts of chlorosulphonic acid are introduced into 160 parts of dimethyl-formamide, while cooling and stirring. After the addition of 15 parts of copper powder, the whole is stirred for 10–15 minutes at 12–15° C., and then 56 parts of diethylcyclohexylamine followed by 10 parts of 1:4-dibenzoylaminoanthraquinone are added while cooling. The whole is heated, advantageously with the exclusion of oxygen, for 2–3 hours at 55–57° C., and the reaction mixture is poured into 1000 parts of ice cold water. By working up the mixture as described in Example 1, there is obtained the sodium salt of the sulphuric acid ester of leuco-1:4-dibenzoylaminoanthraquinone in a yield exceeding 80 percent.

Instead of copper powder, there may be used with like success the same quantity of brass powder.

Furthermore, instead of 1:4-dibenzoylaminoanthraquinone, there may be used 1:4-(di-para-chlorobenzoyl-amino)-anthraquinone or 1-(4'-dimethyl-sulphonamido-benzoyl)-4-(benzoylamino)-anthraquinone.

By using in this example, instead of 56 parts of diethyl-cyclohexylamine, the equivalent quantity of dimethyl-cyclohexylamine or the equivalent quantity of triethyl-amine, there is obtained almost exclusively a product which cannot be reconverted into a vat dyestuff by the usual methods of application. The same result is obtained when more or less than the equivalent quantity of dimethylcyclohexylamine or diethylamine is used.

Example 10

20 parts of chlorosulphonic acid are introduced into 160 parts of dimethyl-formamide, while cooling and stirring. After the addition of 25 parts of iron powder, the mixture is stirred for 10–15 minutes at 12–15° C., and there are added while cooling 56 parts of diethyl-cyclohexylamine and then 10 parts of carbazolized di-(5'-benzoylamino-1'-anthraquinonyl) - 2:8-diaminochrysene. The whole is stirred for 5 hours at 55–57° C., and the diethyl-cyclohexylamine salt of sulphuric acid ester is precipitated by introducing the reaction mixture into 1500 parts of ice cold water, and the salt is converted into the sodium salt by heating it at 50–55° C. in a mixture of 80 parts of alcohol, 20 parts of an aqueous solution of sodium hydroxide of 30 percent strength and 250 parts of water. The sodium salt is obtained by concentrating the resulting mixture, filtering, and adding sodium chloride to the filtrate, the sodium salt being obtained in a yield exceeding 90 percent.

When the above sulphuric acid ester salt is applied to textiles by the usual methods brown tints are obtained.

Example 11

20 parts of chlorosulphonic acid, 25 parts of iron powder and 56 parts of diethylcyclohexylamine are introduced in succession in that order into 160 parts of diethylformamide, while cooling and stirring. After the addition of 10 parts of carbazolized di-(5'-benzoylamino-1'-anthraquinonyl)-2:8-diaminochrysene, the mixture is heated at 67–69° C. for 2–3 hours, while stirring. The reaction mixture is introduced into 1500 parts of ice water, and the precipitate is separated and stirred in a mixture of 100 parts of alcohol, 20 parts of sodium hydroxide solution of 30 percent strength and 250 parts of water at 50–55° C. for 45 minutes. The mixture is filtered to remove the residues of iron and the solution is concentrated under reduced pressure at a bath temperature of 50° C. The sulphuric acid ester salt of leucocarbazolized di-(5'-benzoylamino-1'-anthraquinonyl)-2:8-diaminochrysene is obtained by salting out with sodium chloride in a yield exceeding 90 percent.

Example 12

20 parts of chlorosulphonic acid, 25 parts of iron powder and 56 parts of diethyl-cyclohexylamine are introduced in succession in that order into 160 parts of diethyl-formamide, while cooling and stirring. After the addition of 10 parts of the anthramide obtained from 1:3-dichloro-2-methylanthraquinone and 1:4-monobenzoyl-diaminoanthraquinone the mixture is heated for 2–3 hours at 56–58° C., while stirring. The product is worked up as described in Example 1, and the sulphuric acid ester salt of the leuco compound of the anthrimide is obtained in a yield exceeding 70 percent.

Example 13

The procedure is the same as that described in Example 1, except that the 1:5-dibenzoylaminoanthraquinone is replaced by 10 parts of the anthramide obtained from 1:3-dichloro-2-methylanthraquinone and 1:4-monobenzoyldiaminoanthraquinone. In this manner the corresponding sulphuric acid ester salt is obtained in a yield exceeding 90 percent.

When the sulphuric acid ester salt so obtained is applied to textiles by known methods grey tints are obtained.

Example 14

The procedure is the same as that described in Example 1, except that, instead of 56 parts of diethyl-cyclohexylamine, there are used 62 parts of diethyl-(2-methylcyclohexyl)-amine. In this manner the sulphuric acid ester salt of leuco-1:5-dibenzoylaminoanthraquinone is likewise obtained in a yield exceeding 90 percent.

There may be used with the same success, instead of diethyl-(2-methylcyclohexyl)-amine, diethyl-(3-methylcyclohexyl)-amine, diethyl-(4-methylcyclohexyl)-amine or a mixture of two or all of these homologues, and there may also be used a mixture of one or more of the three homologues with diethylcyclohexylamine.

What I claim is:

1. A process for the manufacture of water-soluble salts of sulphuric acid esters of leuco vat dyestuffs of the anthraquinone series which give an ester yield of less than 25% relative to the weight thereof when esterified by means of a mixture of α-picoline and chlorosulphonic acid (10:1 by weight) in the presence of copper powder, wherein the vat dyestuff is treated in a mixture of at least one dialkyl-formamide of the general formula

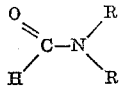

in which both R's represent a member selected from the group consisting of CH₃ and C₂H₅, with at least one compound selected from the group consisting of diethylcyclohexylamine and diethyl-(monomethylcyclohexyl)-amine, the said mixture containing 10–70 percent by weight of amine, and in the presence of at least one finely divided metal selected from the group consisting of iron, cobalt, copper and copper alloys, with chlorosulphonic acid in the form of its addition products with at least one of the said amines, and the resulting sulphuric acid ester compound is converted into a water-soluble ester salt, the proportion of metal being at least 1.5 atomic proportions for each anthraquinone nucleus present in the vat dyestuff, and the molecular proportion of amine to chlorosulphonic acid being at least 2:2 up to a total of 4 mols of said acid and at least 1.4 to 2 thereafter.

2. A process as claimed in claim 1, wherein the proportion of the amine selected from the group consisting of diethyl-cyclohexylamine and diethyl-(monomethylcyclohexyl)-amine in the basic mixture is within the range of 25 to 60 percent on the weight of the said mixture.

3. A process for the manufacture of the water-soluble sulphuric acid ester salt of leuco-1:4-dibenzoylaminoanthraquinone wherein 1:4-dibenzoylamino-anthraquinone is treated with chlorosulphonic acid in a mixture of diethyl-formamide and diethyl-cyclohexylamine, said mixture containing 10–70 percent by weight of said amine, in the presence in the reaction mixture of copper powder, and the resulting sulphuric acid ester compound is converted into the water-soluble sulphuric acid ester salt, the proportion of metal being at least 1.5 atomic proportions for each mol of 1:4-dibenzoylamino-anthraquinone, and the molecular proportion of amine to chlorosulphonic acid being at least 2:2 up to a total of 4 mols of said acid and at least 1.4 to 2 thereafter.

4. A process for the manufacture of the water-soluble sulphuric acid ester salt of leuco-1-(4'-dimethyl-sulphonamido-benzoyl)-4-(benzoylamino)-anthraquinone wherein 1-(4'-dimethyl-sulphonamido-benzoyl)-4-(benzoylamino)-anthraquinone is treated with chlorosulphonic acid in a mixture of dimethyl-formamide and diethyl-cyclohexylamine, said mixture containing 10–70 percent by weight of said amine, in the presence in the reaction mixture of copper powder, and the resulting sulphuric acid ester compound is converted into the water-soluble sulphuric acid ester salt, the proportion of metal being at least 1.5 atomic proportions for each mol of 1-(4'-dimethyl-sulphonamido-benzoyl)-4-(benzoylamino)-anthraquinone, and the molecular proportion of amine to chlorosulphonic acid being at least 2:2 up to a total of 4 mols of said acid and at least 1.4 to 2 thereafter.

5. A process for the manufacture of the water-soluble sulphuric acid ester salt of leuco-carbazolized di-(5'-benzoylamino-1'-anthraquinonyl)-2:8-diaminochrysene wherein carbazolized di-(5'-benzoylamino-1'-anthraquinonyl)-2:8-diaminochrysene is treated with chlorosulphonic acid in a mixture of diethyl-formamide and diethyl-cyclohexylamine, said mixture containing 10–70 percent by weight of said amine, in the presence in the reaction mixture of copper powder, and the resulting sulphuric acid ester compound is converted into the water-soluble sulphuric acid ester salt, the proportion of metal being at least 1.5 atomic proportions for each mol of carbazolized di-(5'-benzoylamino-1'-anthraquinonyl)-2:8-diaminochrysene, and the molecular proportion of amine to chlorosulphonic acid being at least 2:2 up to a total of 4 mols of said acid and at least 1.4 to 2 thereafter.

6. A process for the manufacture of the water-soluble sulphuric acid ester salt of leuco-compound of the anthrimide from 1.3-dichloro-2-methylanthraquinone and 1:4-monobenzoyl-diaminoanthraquinone wherein anthrimide from 1:3-dichloro-2-methylanthraquinone and 1:4-monobenzoyl-diaminoanthraquinone wherein anthrimide from 1:3-dichloro-2-methylanthraquinone and 1:4-monobenzoyl diaminoanthraquinone is treated with chlorosulphonic acid in a mixture of diethyl-formamide and diethyl-cyclohexyl-amine, said mixture containing 10–70 percent by weight of said amine, in the presence in the reaction mixture of copper powder, and the resulting sulphuric acid ester compound is converted into the water-soluble sulphuric acid ester salt, the proportion of metal being at least 1.5 atomic proportions for each anthraquinone nucleus present in the said anthrimide, and the molecular proportion of amine to chlorosulphonic acid being at least 2:2 up to a total of 4 mols of said acid and at least 1.4 to 2 thereafter.

7. A process for the manufacture of the water-soluble sulphuric acid ester salt of leuco-1:5-dibenzoylamino-anthraquinone wherein 1:5 - dibenzoylamino-anthraquinone is treated with chlorosulphonic acid in a mixture of diethyl-formamide and diethyl - cyclohexylamine, said mixture containing 10–70 percent by weight of said amine, in the presence in the reaction mixture of copper powder, and the resulting sulphuric acid ester compound is converted into the water-soluble sulphuric acid ester salt, the proportion of metal being at least 1.5 atomic proportions for each mol of 1:5-dibenzoylamino-anthraquinone, and the molecular proportion of amine to chlorosulphonic acid being at least 2:2 up to a total of 4 mols of said acid and at least 1.4 to 2 thereafter.

References Cited in the file of this patent
UNITED STATES PATENTS

| | | |
|---|---|---|
| 2,403,226 | Lecher et al. | July 2, 1946 |
| 2,506,580 | Coffey et al. | May 9, 1950 |
| 2,685,582 | Coffey et al. | Aug. 3, 1954 |